(12) United States Patent
Robertson et al.

(10) Patent No.: US 7,535,697 B2
(45) Date of Patent: May 19, 2009

(54) FLEXIBLE DOCKING BAY

(75) Inventors: Kenneth G. Robertson, Cupertino, CA (US); Ray Gradwohl, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 11/591,621

(22) Filed: Oct. 31, 2006

(65) Prior Publication Data

US 2008/0101005 A1 May 1, 2008

(51) Int. Cl.
*G06F 1/16* (2006.01)
*G11B 33/02* (2006.01)

(52) U.S. Cl. .............. 361/679.38; 361/679.39; 720/657; 360/94

(58) Field of Classification Search ......... 361/679–686, 361/724–727; 312/223.1, 223.2; 720/652, 720/654, 657; 211/26, 187, 190; 360/94

See application file for complete search history.

(56) References Cited

U.S. PATENT DOCUMENTS

2006/0250764 A1 * 11/2006 Howarth et al. ............. 361/683

* cited by examiner

*Primary Examiner*—Jayprakash N Gandhi
*Assistant Examiner*—Nidhi Desai

(57) ABSTRACT

A flexible docking bay is disclosed. The flexible docking bay comprises a body having a cartridge-receiving portion defining a front region that defines an opening and a rear region that defines a rear bounding wall. A cartridge-encasing wall extends from the opening to the rear bounding wall. The flexible docking bay comprises a sled-receiving feature configured to engage a cartridge. The sled-receiving feature is movably coupled with an interior surface of the cartridge-encasing wall. If the cartridge has physical attributes that when fully inserted into the receiving portion of the flexible docking bay is not fixed by a holding mechanism that secures the sled-receiving feature in a first position, then the cartridge and the sled-receiving feature travel past the holding mechanism to a second position. Otherwise, the cartridge and the sled-receiving feature are held in the first position.

19 Claims, 8 Drawing Sheets

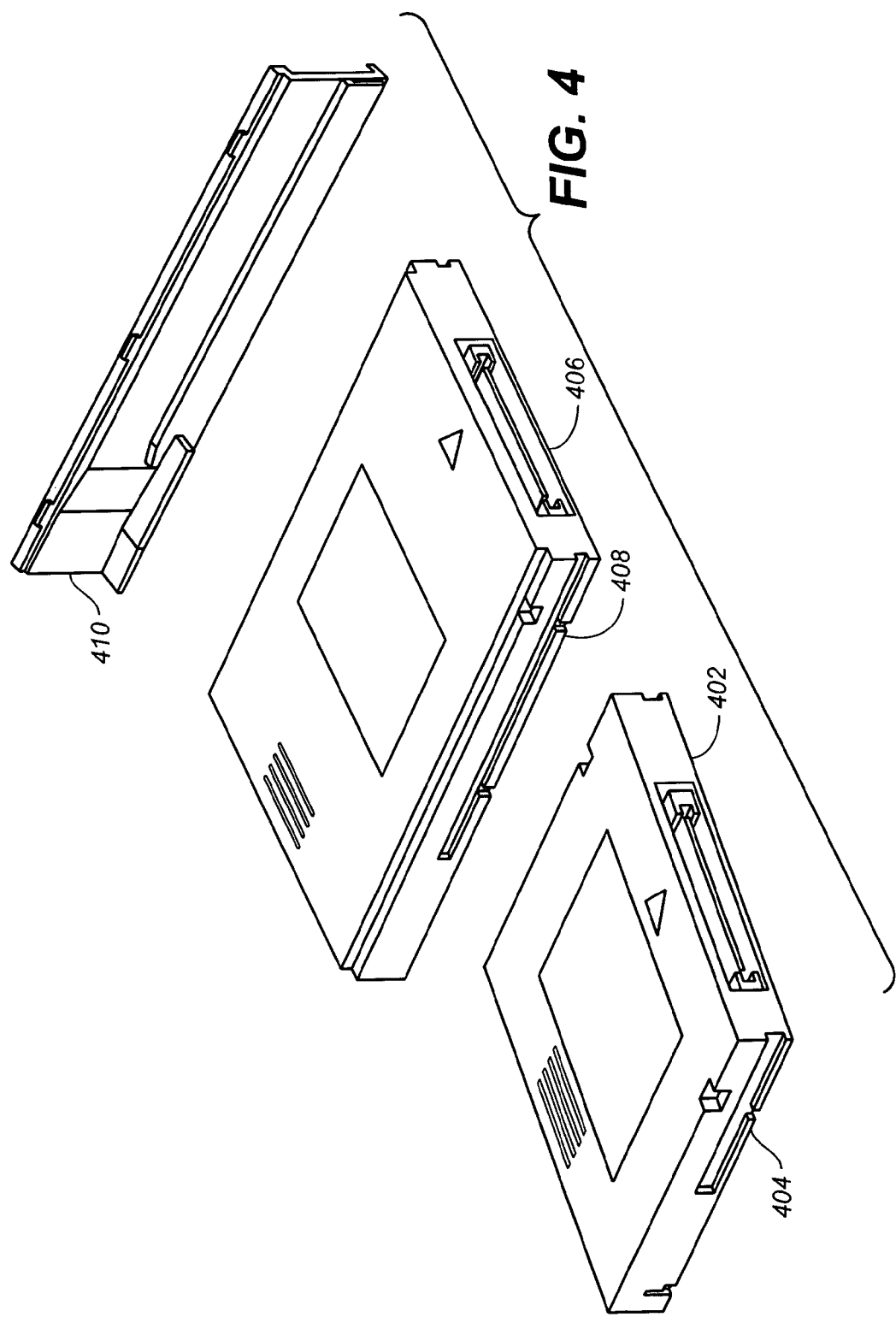

FLEXIBLE DOCKING BAY

BACKGROUND

Often, a personal computer (PC) is equipped with a docking bay that accepts cartridges containing information, such as a hard disk drive cartridge. In general, a docking bay is designed to be compatible with cartridges conforming to a fixed set of physical attributes (e.g., length, width, depth, and/or other defining features or shapes). For example, a docking bay may be designed to accept Information Versatile Disk for Removable usage (iVDR) hard disk drive cartridges of a certain length and shape.

However, manufacturers have designed and produced cartridges of various physical dimensions to suit differing needs. As a result, a personal computer may need to be equipped with multiple docking bays in order to be compatible with cartridges of different physical dimensions. Compatibility between a cartridge and a docking bay involve several issues, including functional compatibility and structural compatibility. With regards to functional compatibility, a manufacturer may be concerned whether a docking bay can functionally connect with the cartridge. Specifically, in some embodiments, in order for the PC to utilize the cartridge, the connector on the docking bay has to be able to mate with the cartridge. With regards to structural compatibility, a manufacturer may be concerned with whether a cartridge fits well within a docking bay. In particular, as one example, a docking bay should be able to hold a cartridge securely such that it does not wobble, shake, and/or vibrate excessively under operation.

In certain instances, a docking bay may be functionally compatible but not structurally compatible a cartridge. In some embodiments, the connector of a docking bay may be functionally compatible with a cartridge. However, the length of the cartridge may exceed the space allotted to the cartridge. Consequently, the cartridge, when functionally connected with the docking station, may structurally protrude from the docking bay. If a door designed to cover the docking bay exists, it would not be able to close properly. Not only is this aesthetically unpleasing, it may negatively affect a PC user. In some embodiments, a protruding cartridge increases the chance that a PC user will accidentally collide with the cartridge. Aside from causing possible physical injuries to the PC user, frequent collisions sustained by the cartridge may cause cartridge damage and/or shorten the cartridge and/or the docking bay's functional lifetime.

As traditional docking bays in generally do not provide a wide range of functional and/or structural compatibility with different cartridges, a user often resorts to installing multiple docking bays. However, this takes away space that could have been designated for other disk drive devices.

For instance, FIG. 1 illustrates cartridges 102, 104, and 106 of different sizes. In one instance, cartridges 102, 104, and 106 are iVDR cartridges of different physical dimensions. Under conventional approaches, a user may need to dedicate multiple docking bays to accept the different cartridges. As illustrated in FIG. 2, a PC is equipped with multiple docking bays to accept cartridges of different sizes. FIG. 2 shows personal computer 114, which comprises docking bay 112 for accepting cartridge 104, docking bay 110 for accepting cartridge 106, and docking bay 108 for accepting cartridge 102. Unfortunately, dedicating multiple docking bays to cartridges of different sizes is an inefficient use of space and limits a user from having other types of disk drive devices.

BRIEF DESCRIPTION OF THE DRAWINGS

The accompanying drawings, which are incorporated in and form a part of this specification, illustrate embodiments of the claimed subject matter and, together with the description, serve to explain the principles of the present claimed subject matter.

(PRIOR ART)

(PRIOR ART)

FIG. 4 illustrates cartridge side details according to some embodiments.

DETAILED DESCRIPTION

Figure 1:
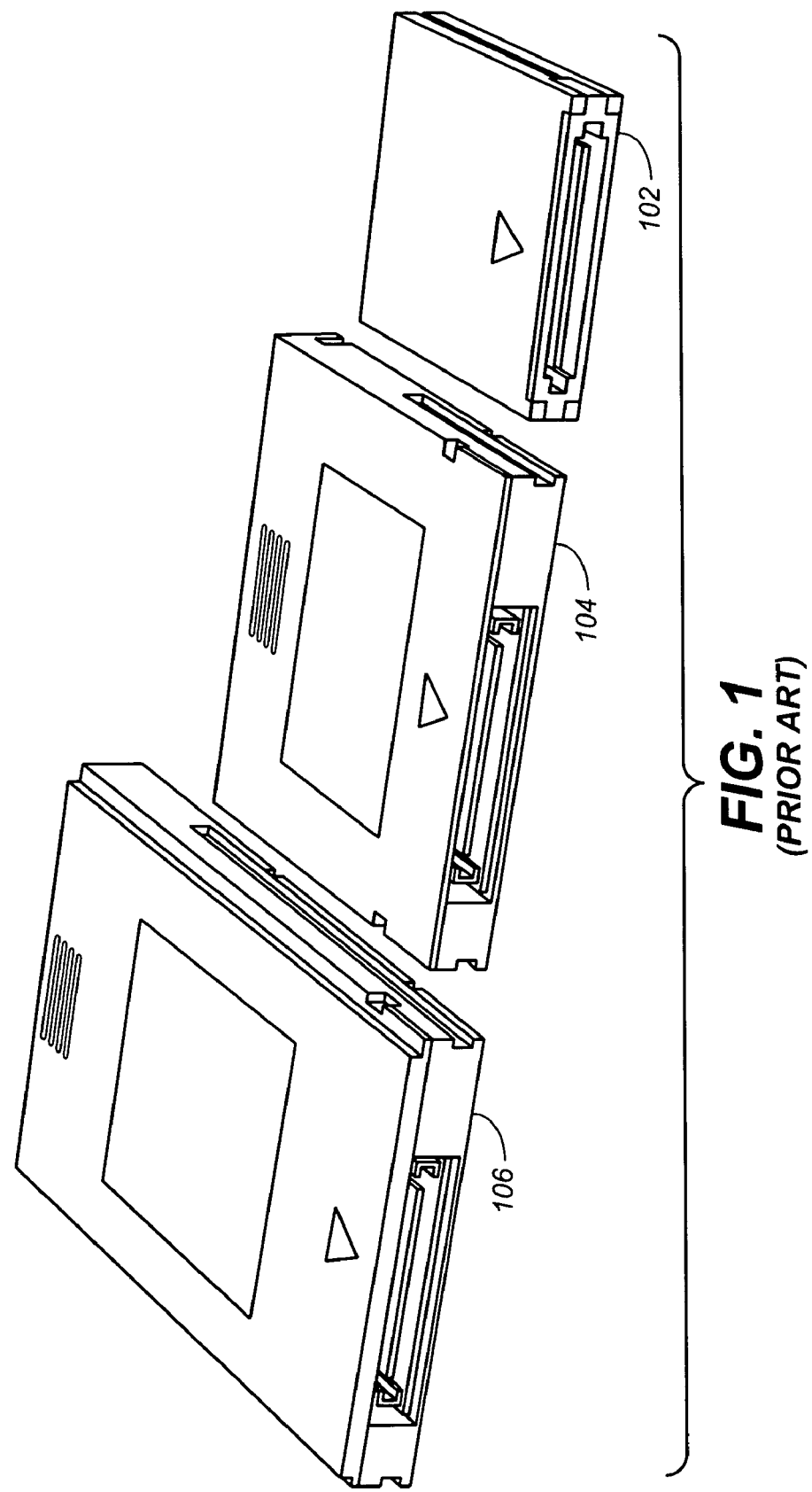
FIG. 1 illustrates cartridges of different sizes, in accordance with the prior art.
Figure 2:
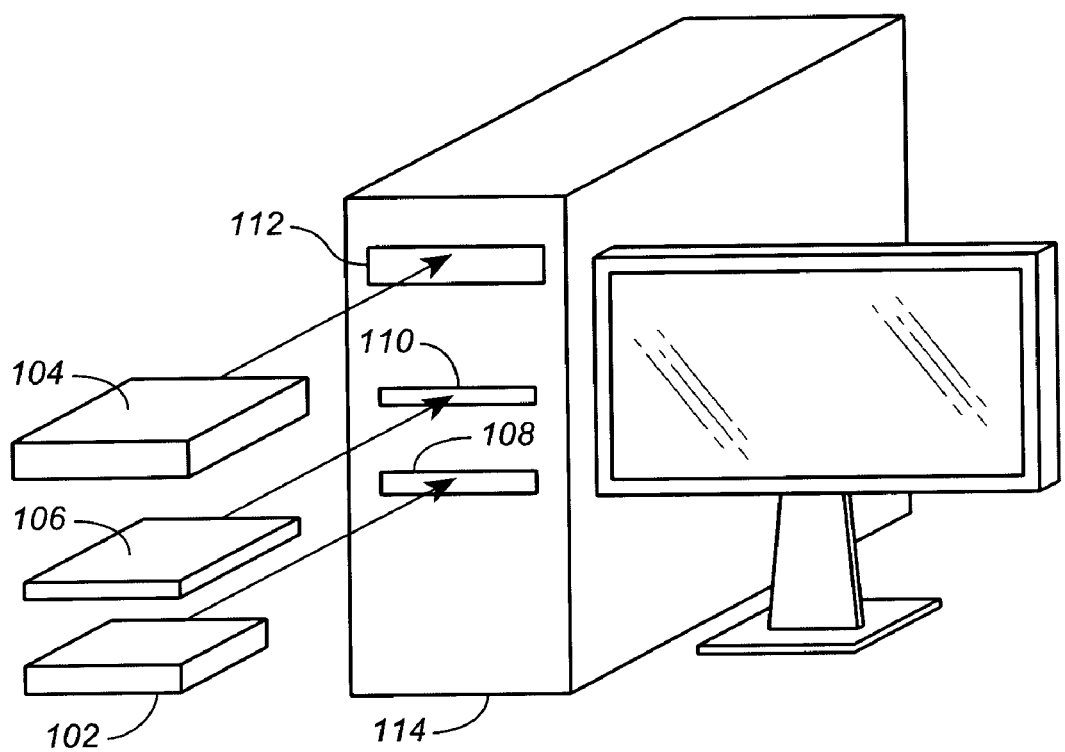
FIG. 2 illustrates a PC with multiple docking bays for accepting cartridges of different sizes, in accordance with the prior art.

Reference will now be made to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be comprised within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details.

In contrast to traditional approaches, the present claimed subject matter sets forth a flexible docking bay capable of accepting differently sized cartridges of different size (e.g., iVDR cartridges of different lengths).

In some embodiments, the flexible docking bay is a standard 3.5" bay but compatible with different sizes of iVDR cartridges (e.g., different cartridge length). For ease of understanding, an embodiment will be considered in which the docking bay is designed to accept cartridges of two sizes: a first longer cartridge and a second shorter cartridge.

The flexible docking bay has internal guides that determine how far a cartridge travels within the docking bay so that the front remains flush with the front face of the flexible docking bay. Thus, the first longer cartridge will travel and stop at a rear position (further away from the front face of the docking bay) and the second shorter cartridge will travel and stop at a forward position (close to front face of the docking bay than rear position). In instances where the docking bay is part of a PC equipped with a door that covers docking bays and drives, the design of embodiments enables both the first longer cartridge and the second shorter cartridge to be independently and fully installed such that neither cartridge protrudes from the docking bay; thus, the PC door to properly closes.

In embodiments, the flexible docking bay is equipped with a sled mechanism that slides back and forth depending on the physical dimensions of the cartridge inserted. In some embodiments, the sled is spring-loaded such that it defaults to the forward position to accept smaller cartridges. Moreover, in some embodiments, a Printed Circuit Board (PCB) connection for mating with a cartridge is coupled with the sled mechanism and is movable with the sled mechanism. Also, in some embodiments, the flexible docking bay is equipped with a front release snap that keeps smaller cartridges in the forward position.

In some embodiments, the first longer cartridge is also greater in height than the second shorter cartridge. In some embodiments, when the first longer cartridge with greater height is inserted into the docking bay, it comes into contact with a front release detail and releases the front release snap that would keep a smaller cartridges in the forward position, thus enabling it to travel to a rear position. Moreover, in some embodiments, the sled, while at its rear position, locks onto the top housing of the flexible docking bay with its snap locking mechanism.

The flexible docking bay is equipped with an eject bar in some embodiments. When pushed, the ejected bar releases the spring-loaded sled and moves it forward to eject a cartridge. The ejector bar preferably delivers enough momentum to the cartridge such that the ejected cartridge sufficiently protrudes from the opening of the flexible docking bay as to enable easy manual removal; although this amount of momentum is not required in all embodiments.

Thus, embodiments enable a user to have one flexible docking bay for accepting cartridges having at least two differing sets of physical dimensions. However, some embodiments are not limited to a flexible docking that accepts cartridges of only two different sizes. Other embodiments of a flexible docking bay accept cartridges having multiple sets of physical dimensions. Furthermore, some embodiments enable different-sized cartridges to fully insert into the flexible docking bay and not protrude, thereby enabling closing of any door that covers the flexible docking bay during usage.

Although embodiments may be shown and described as having certain numbers and types of elements, the present claimed subject matter is not so limited; that is, embodiments may comprise elements other than those shown, and/or may comprise more than one of the elements that are shown.

Figure 3:
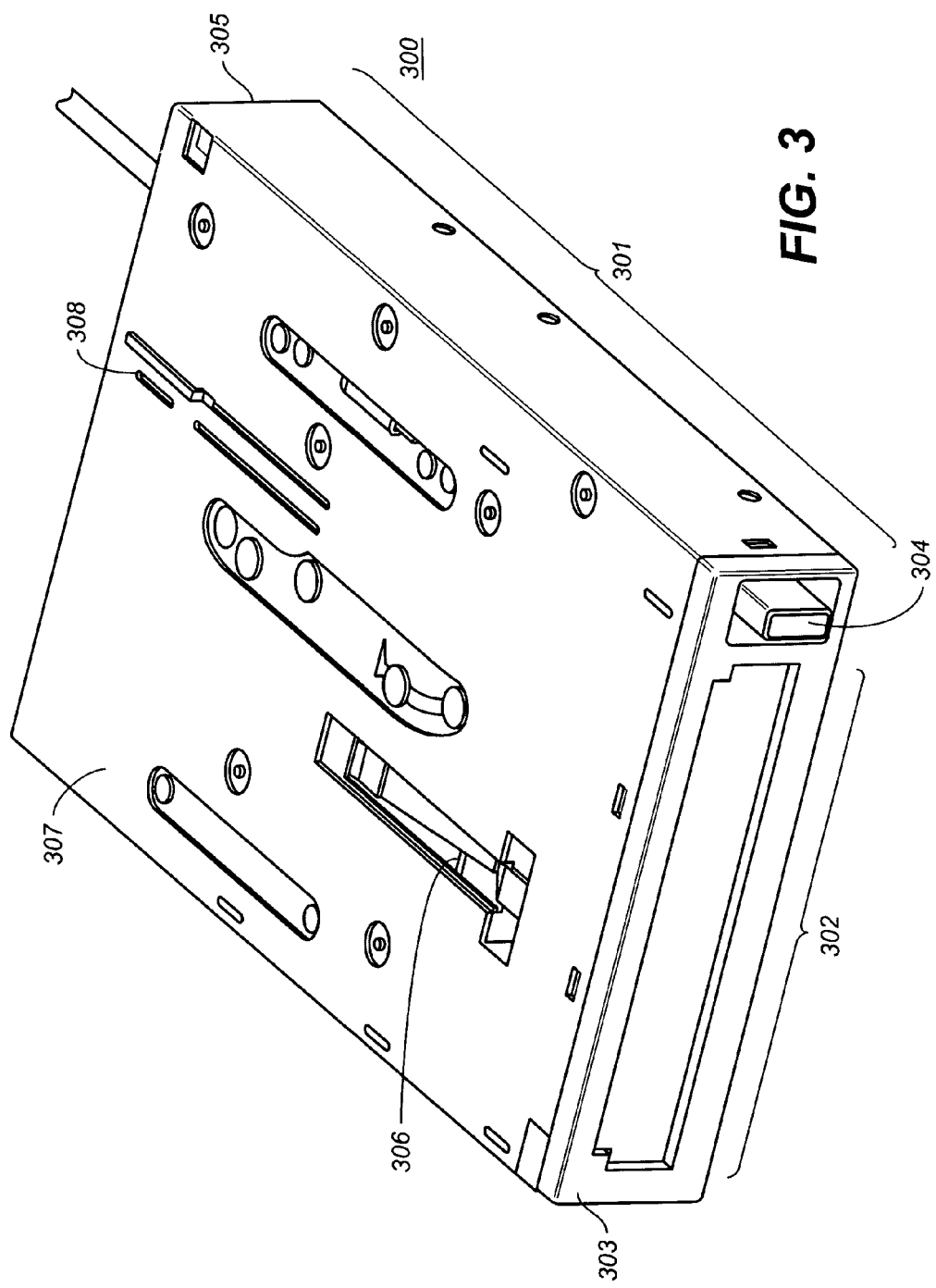
FIG. 3 illustrates a perspective view of an embodiment of a flexible docking bay.

FIG. 3 illustrates a perspective view of an embodiment of a flexible docking bay 300. The flexible docking bay 300 comprises a body 301 having a cartridge-receiving portion 303. The cartridge-receiving portion 303 has a front region that defines an opening 302 and a rear bounding wall 305. The cartridge-receiving portion 303 further comprises a cartridge-encasing wall 307 extending from the opening 302 to the rear bounding wall 305. The flexible docking bay 300 also comprises a sled-receiving feature (e.g., Sled-receiving feature 506 in FIG. 5B) configured to engage a cartridge. The sled-receiving feature is movably coupled with an interior surface of the cartridge-encasing wall (307). In some embodiments, a printed circuit board (PCB) connection for mating with a cartridge is coupled with said sled-receiving feature and moves with the sled-receiving feature. Also, in some embodiments, the sled-receiving feature is spring-loaded.

If the cartridge (e.g., a cartridge under a certain size) has physical attributes that when fully inserted into the receiving portion of the flexible docking bay 300 fails to engage the holding mechanism that is able to secures some cartridges (e.g., cartridges over a certain size) in a first position, then the cartridge (e.g., a smaller cartridge) and the sled-receiving feature travels past the holding mechanism to a second position. In some embodiments, the holding mechanism comprises guides coupled with the interior surface of the cartridge-encasing wall that in conjunction with side details (e.g., groove patterns) of a cartridge (e.g., a cartridge over a certain size) limits insertion depth. If the cartridge has physical attributes that when fully inserted into the receiving portion is fixed by the holding mechanism, then the cartridge and the sled-receiving feature are held in the first position. Physical attributes can be cartridge length, width, depth, shape and/or other defining physical characteristics.

Also, flexible docking bay 300 comprises an eject bar 304 for ejecting a cartridge, a front release detail 306 that prevents a smaller cartridge from reaching a rear position, and a rear release detail 308 that holds the sled in the rear position when a larger cartridge is inserted. Further, in some embodiments, if the cartridge is fully inserted into the flexible docking bay and the sled-receiving feature is in the second position (e.g., the rear position), the cartridge is flush mounted within the flexible docking bay and does not protrude from the flexible docking bay.

FIG. 4 illustrates how cartridge side details can be utilized to limit insertion depth on guides in some embodiments. As a cartridge is inserted into an embodiment of an adaptable docking bay, the side details of a cartridge engages a guide coupled with the interior surface of the adaptable docking bay. FIG. 4 shows a guide 410, a first (longer) cartridge 406 having side details 408, and a second (shorter) cartridge 402 having side details 404. It can be seen that the groove defined by the first side detail 408 is longer than the groove defined by the second side detail 404; thus the first longer cartridge 406 can be inserted deeper into the adaptable docking bay.

Figure 5A:
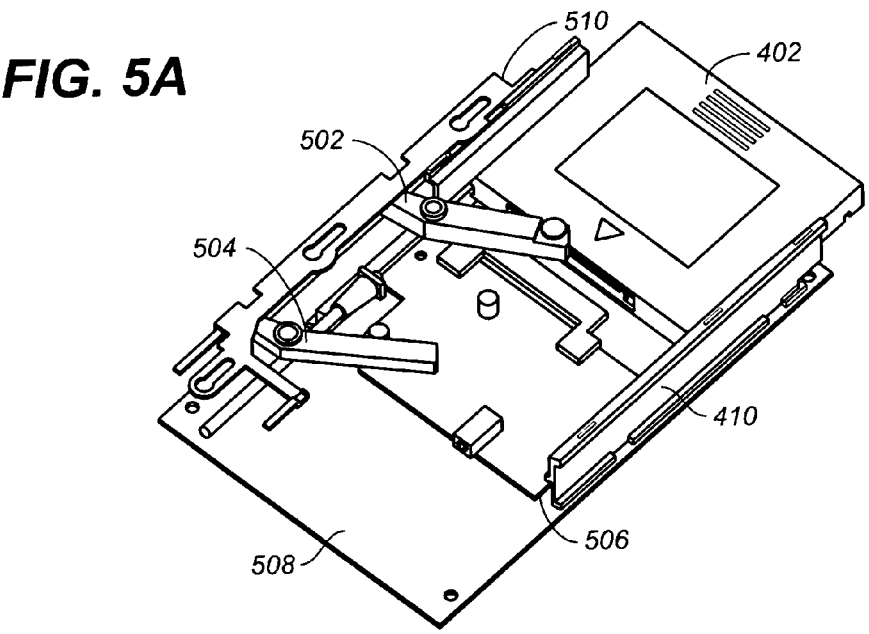
FIGS. 5A and 5B illustrate example extractors according to some embodiments.
Figure 5B:
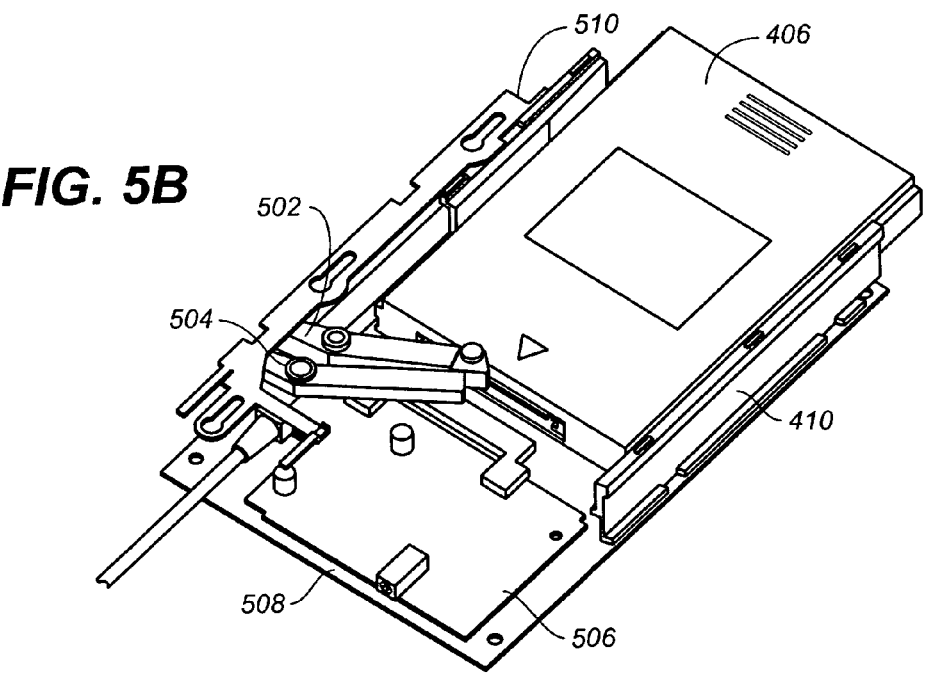

FIGS. 5A and 5B illustrate how extractors operate in some embodiments. FIGS. 5A and 5B comprise a first extractor 502, a second extractor 504, a first cartridge 402, a second cartridge 406, sled-receiving feature 506, flexible docking bay housing 508, an eject bar 510, and a guide 410.

In some embodiments, the first extractor 502 travels with the sled-receiving feature 506, and the second extractor 504 stays with the flexible docking bay housing 508 for use in the rear position. Also, in some embodiments, the eject bar 510 pushes on both extractors (extractor 502 and 504) depending on the position of the sled-receiving feature 506.

In some embodiments, as the eject bar 510 is sufficiently pressed, the eject bar 510 releases the spring-loaded sled-receiving feature 506. The spring-loaded sled-receiving feature 506 moves forward with sufficient speed to eject a cartridge with enough momentum such that at least a portion of the ejected cartridge protrudes conveniently from the opening of the flexible docking bay. A user may then manually remove the cartridge with ease.

Figure 6A:
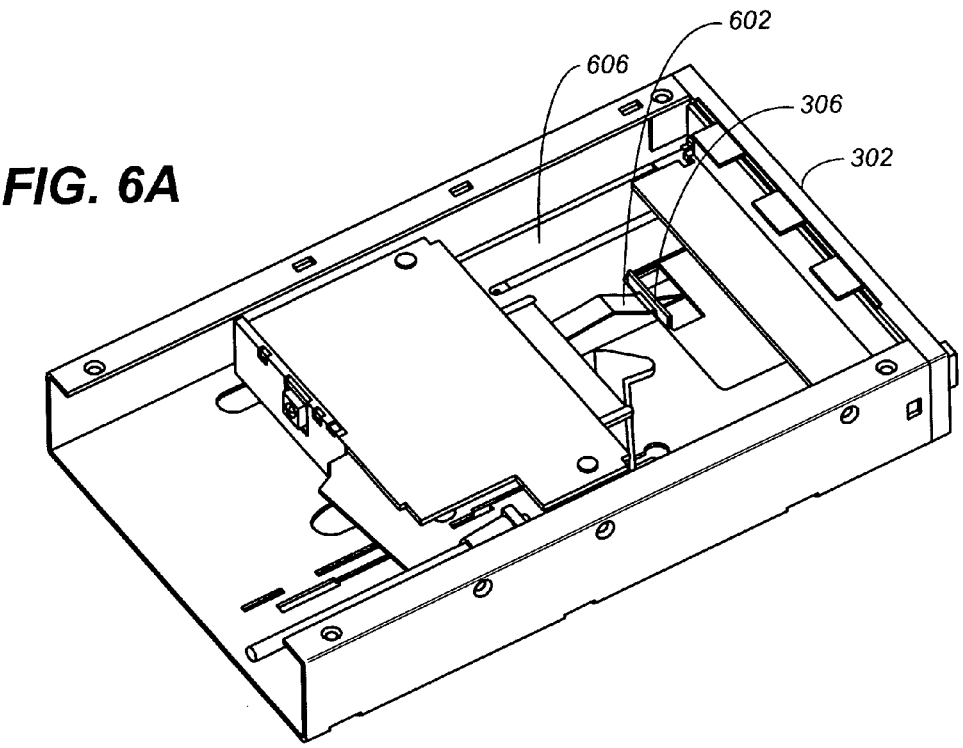
FIGS. 6A and 6B illustrate an example front release detail, according to some embodiments.
Figure 6B:
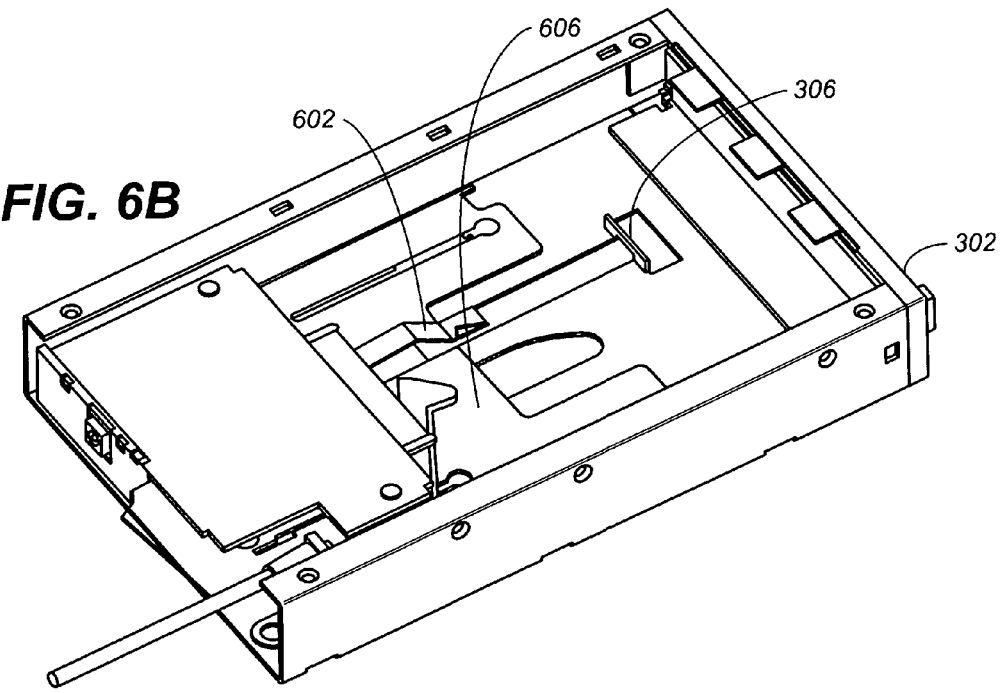

FIGS. 6A and 6B illustrate an embodiment of the function served by the front release detail. FIGS. 6A and 6B comprise an opening 302, a sled-receiving feature 606, a front release detail snap 602 coupled with the sled-receiving feature 606, and a front release detail 306.

In some embodiments, the front release detail snap 602 is utilized to secure a shorter cartridge and prevent the smaller cartridge from traveling to a rear position. At the same time, the front release detail snap 602 enables a longer cartridge with a greater height to disengage the front release detail snap 602 from front release detail 306 as the longer cartridge is fully inserted and enables the longer cartridge to travel to the rear position.

Referring to FIG. 6A, front release detail snap 602 is shown as engaging front release detail 306. Front release detail snap 602, in this embodiment, is designed with an angle ramp portion that when sufficiently pressed, and is able to disengage the front release detail snap 602 from front release detail 306.

When a shorter cartridge is inserted into the flexible docking bay, the front release detail snap 602 remains engaged with the front release detail 306 to prevent the sled-receiving feature 606 from reaching a rear position. When a longer cartridge with a greater height is inserted into the flexible docking bay, the front release detail snap 602 is disengaged from the front release detail 306. Specifically, as a longer (and potentially taller) cartridge is inserted, the top of the cartridge comes into physical contact with the angled ramp portion of the front release detail snap 602, thus pushing the front release detail snap 602 down and away from the front release detail 306. Consequently, as the front release detail snap 602 is disengaged, the sled-receiving feature 606 is able to travel to a rear position; thus, a longer cartridge can be fully inserted into the flexible docking bay.

Figure 7A:
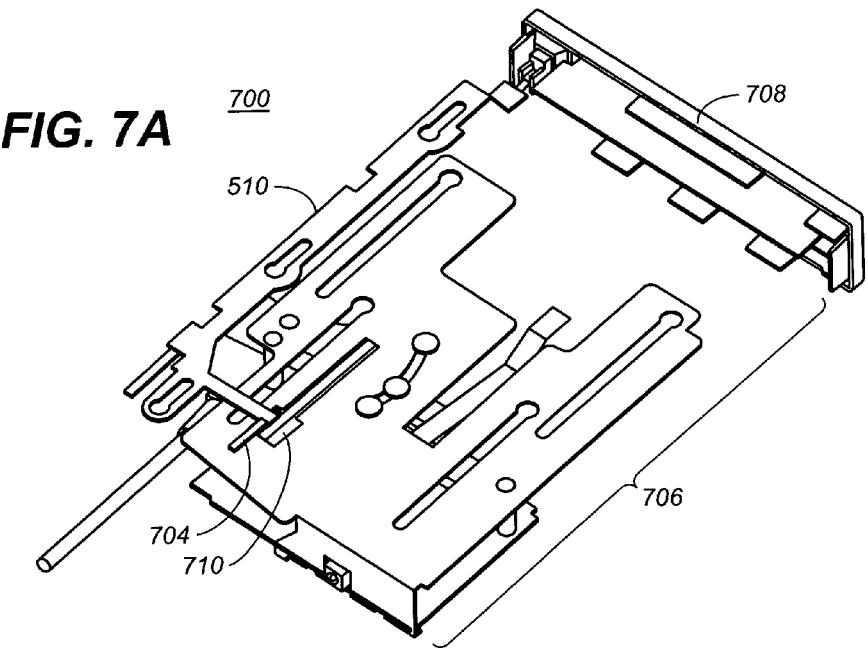
FIGS. 7A and 7B illustrate an example rear release detail, according to some embodiments.
Figure 7B:
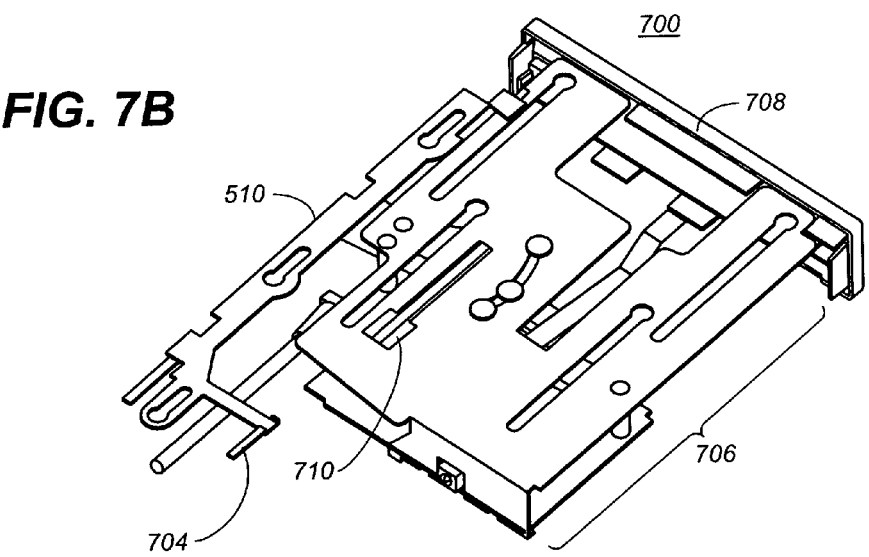

FIGS. 7A and 7B illustrate a rear release detail of some embodiments. FIGS. 7A and 7B comprise a flexible docking bay 700, an eject bar 510, a rear release bar 704, a sled-receiving portion 706, an opening 708, and a rear release detail snap 710. In some embodiments, the flexible docking bay is a 3.5" docking bay. In some embodiments, the sled-receiving portion 706 is spring-loaded as to automatically default to a forward position.

Referring to FIG. 7A, in some embodiments, as a larger cartridge is fully inserted; the sled-receiving portion 706 locks onto the rear release detail 308 (illustrated in FIG. 3). This locking mechanism helps to stabilize the cartridge to prevent excessive movement during operation. The cartridge can be a hard disk cartridge, such as an iVDR cartridge.

With reference to FIG. 7B, by pressing the extractor 702, the rear release detail 704 moves towards the rear, causing the rear release detail snap 710 to disengage from rear release detail 308 in FIG. 3, thereby causing spring-loaded sled-receiving portion 706 to move forward, ejecting the cartridge.

Figure 8:
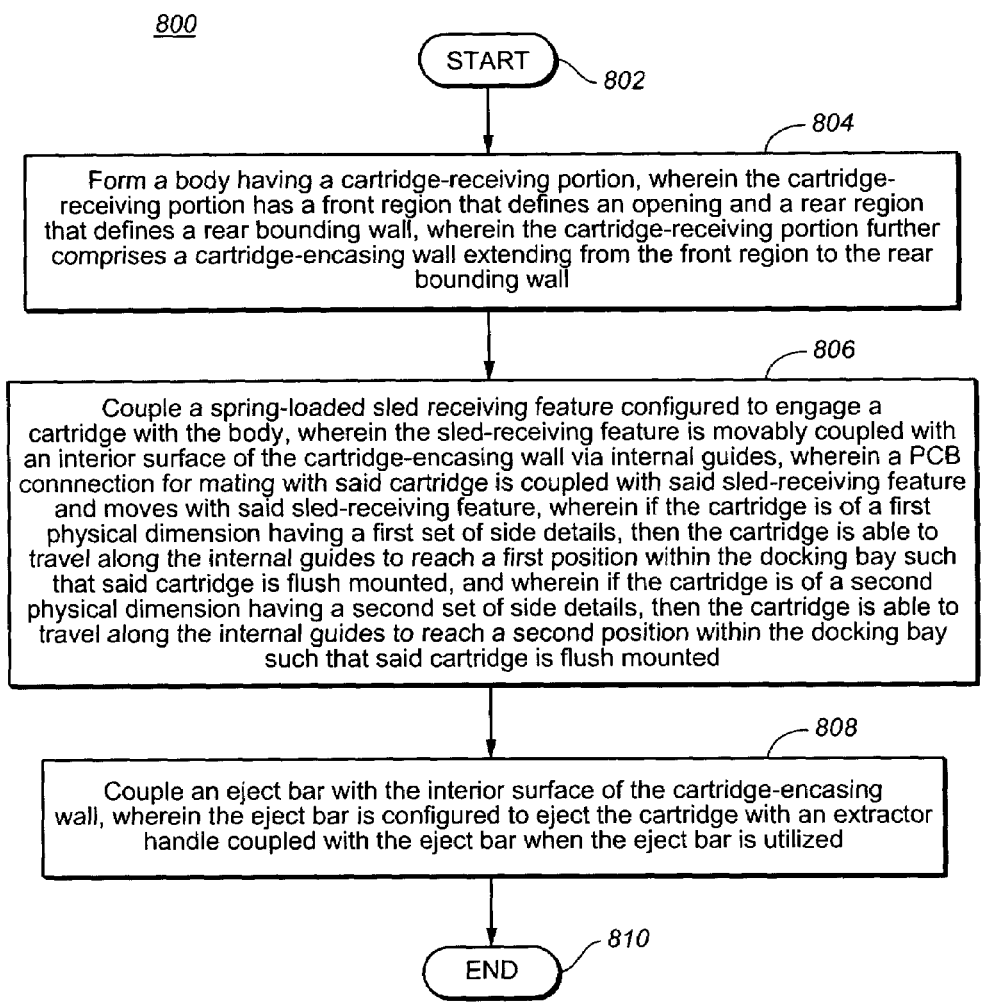
FIG. 8 illustrates a flowchart of a method of manufacturing an adaptable docking bay, according to some embodiments.

FIG. 8 illustrates a flowchart 800 of a method of manufacturing an adaptable docking bay according to some embodiments. Although specific steps are disclosed in flowchart 800, such steps are exemplary. That is, embodiments of the present claimed subject matter are well suited to performing various other or additional steps or variations of the steps recited in flowchart 800. It is appreciated that the steps in flowchart 800 can be performed in an order different than presented.

At block 802, the process starts. At block 804, a body having a cartridge-receiving portion is formed. The cartridge-receiving portion has a front region that defines an opening and a rear region that defines a rear bounding wall. The cartridge-receiving portion further comprises a cartridge-encasing wall extending from the front region to the rear bounding wall. In some embodiments, the cartridge-encasing wall comprises a releasable snap-lock mechanism proximate to the rear bounding wall configured to secure the cartridge when the cartridge is in a rear position.

At block 806, a spring-loaded sled-receiving feature is coupled with the body. The sled-receiving feature is movably coupled with an interior surface of the cartridge-encasing wall via internal guides. If the cartridge is of a first physical dimension having a set of side details, then the cartridge is able to travel along the internal guides to reach a first position within the docking bay. If the cartridge is of a second physical dimension having a different set of side details than the first cartridge, then the cartridge is able to travel along the internal guides to reach a second position within the docking bay. In some embodiments, the sled-receiving feature is coupled with the body via a pair of parallel guide rails located on the interior surface of the cartridge-encasing wall. In some embodiments, the sled-receiving feature comprises a docking connector (e.g., a PCB connector) configured to mate with the cartridge. In some embodiments, the sled-receiving feature enables the cartridge to be flush mounted such that it does not protrude from the docking bay.

At block 808, an eject bar is coupled with the interior surface of the cartridge-encasing wall. In some embodiments, the eject bar is configured to eject the cartridge with an extractor handle coupled with the eject bar when the eject bar is utilized. At block 810, the process ends.

What is claimed is:

1. A flush mounting docking bay comprising:
   a body having a cartridge-receiving portion, wherein said cartridge-receiving portion has a rear bounding wall and a front region that defines an opening, and wherein said cartridge-receiving portion further comprises a cartridge-encasing wall extending from said front region to said rear bounding wall;
   a sled-receiving feature configured to engage a cartridge, wherein said sled-receiving feature is movably coupled with an interior surface of said cartridge-encasing wall, wherein if said cartridge has physical attributes that when inserted into said receiving portion of a flexible docking bay does not enable a holding mechanism to engage said cartridge in a first position, then said cartridge and said sled-receiving feature travel to a second position, and wherein if said cartridge has physical attributes that when inserted into said receiving portion does enable said holding mechanism to engage said cartridge in said first position, then said cartridge and said sled-receiving feature are held in said first position, wherein said flexible docking bay comprises a locking mechanism that secures said cartridge in said first position when engaged.

2. The flush mounting docking bay of claim 1, wherein said sled-receiving feature is spring-loaded.

3. A flush mounting docking bay comprising:
   a body having a cartridge-receiving portion, wherein said cartridge-receiving portion has a rear bounding wall and a front region that defines an opening, and wherein said cartridge-receiving portion further comprises a cartridge-encasing wall extending from said front region to said rear bounding wall;
   a sled-receiving feature configured to engage a cartridge, wherein said sled-receiving feature is movably coupled with an interior surface of said cartridge-encasing wall, wherein if said cartridge has physical attributes that when inserted into said receiving portion of a flexible docking bay does not enable a holding mechanism to engage said cartridge in a first position, then said cartridge and said sled-receiving feature travel to a second position, and wherein if said cartridge has physical attributes that when inserted into said receiving portion does enable said holding mechanism to engage said cartridge in said first position, then said cartridge and said sled-receiving feature are held in said first position, wherein a Printed Circuit Board (PCB) connection for mating with said cartridge is coupled with said sled-receiving feature and moves with said sled-receiving feature.

4. A flush mounting docking bay comprising:
   a body having a cartridge-receiving portion, wherein said cartridge-receiving portion has a rear bounding wall and a front region that defines an opening, and wherein said cartridge-receiving portion further comprises a cartridge-encasing wall extending from said front region to said rear bounding wall;
a sled-receiving feature configured to engage a cartridge, wherein said sled-receiving feature is movably coupled with an interior surface of said cartridge-encasing wall, wherein if said cartridge has physical attributes that when inserted into said receiving portion of a flexible docking bay does not enable a holding mechanism to engage said cartridge in a first position, then said cartridge and said sled-receiving feature travel to a second position, and wherein if said cartridge has physical attributes that when inserted into said receiving portion does enable said holding mechanism to engage said cartridge in said first position, then said cartridge and said sled-receiving feature are held in said first position, wherein said holding mechanism utilizes side details on said cartridge to limit insertion depth.

5. A flush mounting docking bay comprising:
a body having a cartridge-receiving portion, wherein said cartridge-receiving portion has a rear bounding wall and a front region that defines an opening, and wherein said cartridge-receiving portion further comprises a cartridge-encasing wall extending from said front region to said rear bounding wall, wherein said cartridge-encasing wall further comprises a releasable snap-lock mechanism proximate to said rear bounding wall configured to secured said cartridge when said cartridge is in said second position;
a sled-receiving feature configured to engage a cartridge, wherein said sled-receiving feature is movably coupled with an interior surface of said cartridge-encasing wall, wherein if said cartridge has physical attributes that when inserted into said receiving portion of a flexible docking bay does not enable a holding mechanism to engage said cartridge in a first position, then said cartridge and said sled-receiving feature travel to a second position, and wherein if said cartridge has physical attributes that when inserted into said receiving portion does enable said holding mechanism to engage said cartridge in said first position, then said cartridge and said sled-receiving feature are held in said first position.

6. A flush mounting docking bay comprising:
a body having a cartridge-receiving portion. wherein said cartridge-receiving portion has a rear bounding wall and a front region that defines an opening, and wherein said cartridge-receiving portion further comprises a cartridge-encasing wall extending from said front region to said rear bounding wall;
a sled-receiving feature configured to engage a cartridge, wherein said sled-receiving feature is movably coupled with an interior surface of said cartridge-encasing wall, wherein if said cartridge has physical attributes that when inserted into said receiving portion of a flexible docking bay does not enable a holding mechanism to engage said cartridge in a first position, then said cartridge and said sled-receiving feature travel to a second position, and wherein if said cartridge has physical attributes that when inserted into said receiving portion does enable said holding mechanism to engage said cartridge in said first position, then said cartridge and said sled-receiving feature are held in said first position, wherein said sled-receiving feature further comprises a lock mechanism for securing said cartridge.

7. The flush mounting docking bay of claim 1, wherein said cartridge is a hard disk drive cartridge.

8. A flush mounting docking bay comprising:
a body having a cartridge-receiving portion, wherein said cartridge-receiving portion has a rear bounding wall and a front region that defines an opening, and wherein said cartridge-receiving portion further comprises a cartridge-encasing wall extending from said front region to said rear bounding wall;
a sled-receiving feature configured to engage a cartridge, wherein said sled-receiving feature is movably coupled with an interior surface of said cartridge-encasing wall, wherein if said cartridge has physical attributes that when inserted into said receiving portion of a flexible docking bay does not enable a holding mechanism to engage said cartridge in a first position, then said cartridge and said sled-receiving feature travel to a second position, and wherein if said cartridge has physical attributes that when inserted into said receiving portion does enable said holding mechanism to engage said cartridge in said first position, then said cartridge and said sled-receiving feature are held in said first position, wherein said cartridge is a Information Versatile Disk for Removable usage (iVDR) hard disk drive cartridge.

9. A flush mounting docking bay comprising:
a body having a cartridge-receiving portion, wherein said cartridge-receiving portion has a rear bounding wall and a front region that defines an opening, and wherein said cartridge-receiving portion further comprises a cartridge-encasing wall extending from said front region to said rear bounding wall;
a sled-receiving feature configured to engage a cartridge, wherein said sled-receiving feature is movably coupled with an interior surface of said cartridge-encasing wall, wherein if said cartridge has physical attributes that when inserted into said receiving portion of a flexible docking bay does not enable a holding mechanism to engage said cartridge in a first position, then said cartridge and said sled-receiving feature travel to a second position, and wherein if said cartridge has physical attributes that when inserted into said receiving portion does enable said holding mechanism to engage said cartridge in said first position, then said cartridge and said sled-receiving feature are held in said first position, wherein said flexible docking bay is a 3.5" inch docking bay.

10. The flush mounting docking bay of claim 1, wherein said sled-receiving feature is spring-loaded as to automatically default to a forward position.

11. The flush mounting docking bay of claim 1, wherein said physical attributes comprises at least one of cartridge length, cartridge width, cartridge depth, and cartridge shape.

12. The flush mounting docking bay of claim 1, further comprises an eject bar that, when pushed, ejects said cartridge.

13. A method of manufacturing an adaptable docking bay comprising:
forming a body having a cartridge-receiving portion, wherein said cartridge-receiving portion has a rear bounding wall and a front region that defines an opening, wherein said cartridge-receiving portion further comprises a cartridge-encasing wall extending from said front region to said rear bounding wall;
coupling a sled-receiving feature configured to engage a cartridge with said body with an interior surface of said cartridge-encasing wall, wherein if said cartridge comprises a set of physical attributes, then said cartridge is able to reach a first position within said docking bay such that said cartridge is flush mounted, and wherein if said cartridge comprises a different set of physical attributes, then said cartridge is able to reach a second position within said docking bay such that said cartridge is flush mounted, wherein said docking bay comprises a locking mechanism that secures said cartridge in said first position when engaged.

14. The method of manufacturing an adaptable docking bay as recited in claim 13, wherein said physical attributes comprises at least one of cartridge groove pattern, cartridge length, cartridge width, cartridge depth, and cartridge shape.

15. A method of manufacturing an adaptable docking bay comprising:
   forming a body having a cartridge-receiving portion, wherein said cartridge-receiving portion has a rear bounding wall and a front region that defines an opening, wherein said cartridge-receiving portion further comprises a cartridge-encasing wall extending from said front region to said rear bounding wall;
   coupling a sled-receiving feature configured to engage a cartridge with said body with an interior surface of said cartridge-encasing wall, wherein if said cartridge comprises a set of physical attributes, then said cartridge is able to reach a first position within said docking bay such that said cartridge is flush mounted, and wherein if said cartridge comprises a different set of physical attributes, then said cartridge is able to reach a second position within said docking bay such that said cartridge is flush mounted; and
   coupling said sled-receiving feature with said body via a pair of parallel guide rails located on said interior surface of said cartridge-encasing wall.

16. A method of manufacturing an adaptable docking bay comprising:
   forming a body having a cartridge-receiving portion, wherein said cartridge-receiving portion has a rear bounding wall and a front region that defines an opening, wherein said cartridge-receiving portion further comprises a cartridge-encasing wall extending from said front region to said rear bounding wall;
   coupling a sled-receiving feature configured to engage a cartridge with said body with an interior surface of said cartridge-encasing wall, wherein if said cartridge comprises a set of physical attributes, then said cartridge is able to reach a first position within said docking bay such that said cartridge is flush mounted, and wherein if said cartridge comprises a different set of physical attributes, then said cartridge is able to reach a second position within said docking bay such that said cartridge is flush mounted; and
   coupling an eject bar with the interior surface of said cartridge-encasing wall, wherein said eject bar is configured to eject said cartridge with an extractor handle coupled with said eject bar when said eject bar is utilized.

17. An adjustable docking bay for flush mounting comprising:
   a cartridge-receiving means having a front region that defines an opening and a rear region that defines a rear bounding wall, wherein said cartridge-receiving means further comprises a cartridge-encasing wall extending from said opening to said rear bounding wall;
   a sled-receiving means configured to engage a cartridge, wherein if said cartridge has physical attributes that when inserted into said receiving portion of said docking bay disengages a releasable lock that secures said sled-receiving means in a first position, then said cartridge and said sled-receiving means travel past said releasable lock to a second position, and wherein if said cartridge has physical attributes that when fully inserted into said receiving portion fails to disengage said releasable lock, then said cartridge and said sled-receiving means are held in said first position.

18. The adjustable docking bay of claim 17, wherein if said cartridge is fully inserted and said sled-receiving means is in said second position, said cartridge does not protrude from said adjustable docking bay.

19. The adjustable docking bay of claim 17, wherein said physical attributes comprises at least one of cartridge groove pattern, cartridge length, cartridge width, cartridge depth, and cartridge shape.

* * * * *

UNITED STATES PATENT AND TRADEMARK OFFICE
CERTIFICATE OF CORRECTION

| | |
|---|---|
| PATENT NO. | : 7,535,697 B2 |
| APPLICATION NO. | : 11/591621 |
| DATED | : May 19, 2009 |
| INVENTOR(S) | : Kenneth G. Robertson et al. |

It is certified that error appears in the above-identified patent and that said Letters Patent is hereby corrected as shown below:

In column 7, line 44, in Claim 6, delete "portion." and insert -- portion, --, therefor.

Signed and Sealed this

Eighth Day of September, 2009

David J. Kappos
*Director of the United States Patent and Trademark Office*